United States Patent
Lauinger

(10) Patent No.: US 6,704,108 B2
(45) Date of Patent: Mar. 9, 2004

(54) 3D GRATING OPTICAL SENSOR COMPRISING A DIFFUSION PLATE FOR CONDUCTING CHROMATOMETRY WITH COLOR CONSTANCY PERFORMANCE

(76) Inventor: Norbert Lauinger, Kalsmunt-Westhang 9, D-35578 Wetzlar (DE)

( * ) Notice: Subject to any disclaimer, the term of this patent is extended or adjusted under 35 U.S.C. 154(b) by 0 days.

(21) Appl. No.: 10/030,053

(22) PCT Filed: Apr. 24, 2001

(86) PCT No.: PCT/DE01/01568

§ 371 (c)(1),
(2), (4) Date: Jan. 8, 2002

(87) PCT Pub. No.: WO01/86242

PCT Pub. Date: Nov. 15, 2001

(65) Prior Publication Data

US 2003/0053062 A1 Mar. 20, 2003

(30) Foreign Application Priority Data

May 8, 2000 (DE) .......................... 100 22 349
Apr. 5, 2001 (DE) .......................... 101 16 996

(51) Int. Cl.[7] ............................................. G01N 21/25
(52) U.S. Cl. .............................. 356/406; 250/237 G
(58) Field of Search ................... 356/402, 405, 356/406; 359/566, 237; 250/237 G, 208.1, 226, 216

(56) References Cited

U.S. PATENT DOCUMENTS

| | | | |
|---|---|---|---|
| 3,749,922 A | * | 7/1973 | Meeussen ................... 250/550 |
| 3,874,799 A | | 4/1975 | Isaacs |
| 4,029,419 A | | 6/1977 | Schumann, Jr. et al. |
| 4,634,248 A | * | 1/1987 | Ostermeier ................. 396/322 |
| 4,823,185 A | * | 4/1989 | Miyamoto et al. ....... 348/227.1 |
| 4,965,663 A | | 10/1990 | Sasaki |
| 5,088,816 A | * | 2/1992 | Tomioka et al. ............... 356/39 |
| 5,771,312 A | | 6/1998 | Spitzer |
| 5,914,749 A | * | 6/1999 | Bawolek et al. ............. 348/273 |
| 5,982,483 A | * | 11/1999 | Lauinger et al. ......... 356/239.2 |
| 6,411,746 B1 | * | 6/2002 | Chamberlain et al. .......... 385/2 |
| 6,433,873 B1 | * | 8/2002 | Chen .......................... 356/406 |

FOREIGN PATENT DOCUMENTS

| | | |
|---|---|---|
| EP | 0 753 725 | 1/1997 |
| WO | 97/22849 | 6/1997 |

* cited by examiner

Primary Examiner—Zandra V. Smith
Assistant Examiner—Gordon J Stock
(74) Attorney, Agent, or Firm—Foley & Lardner

(57) ABSTRACT

A grating optical sensor includes: a lens imaging an object space; a diffractive hexagonal 3D grating optical modulator in the image plane of the lens to form at least one trichromatic RGB diffraction pattern; a photoelectric receiver arrangement arranged in the near field downstream of the modulator, having individual receivers configured to generate electric signals in accordance with centrosymmetrically trichromatic RGB diffraction orders of the diffraction pattern; an evaluation device for the electric signals generated by the individual receivers; and at least one light-diffusion plate arranged in either a pupillary plane of the lens or a papillary plane conjugate to the lens or both.

17 Claims, 5 Drawing Sheets

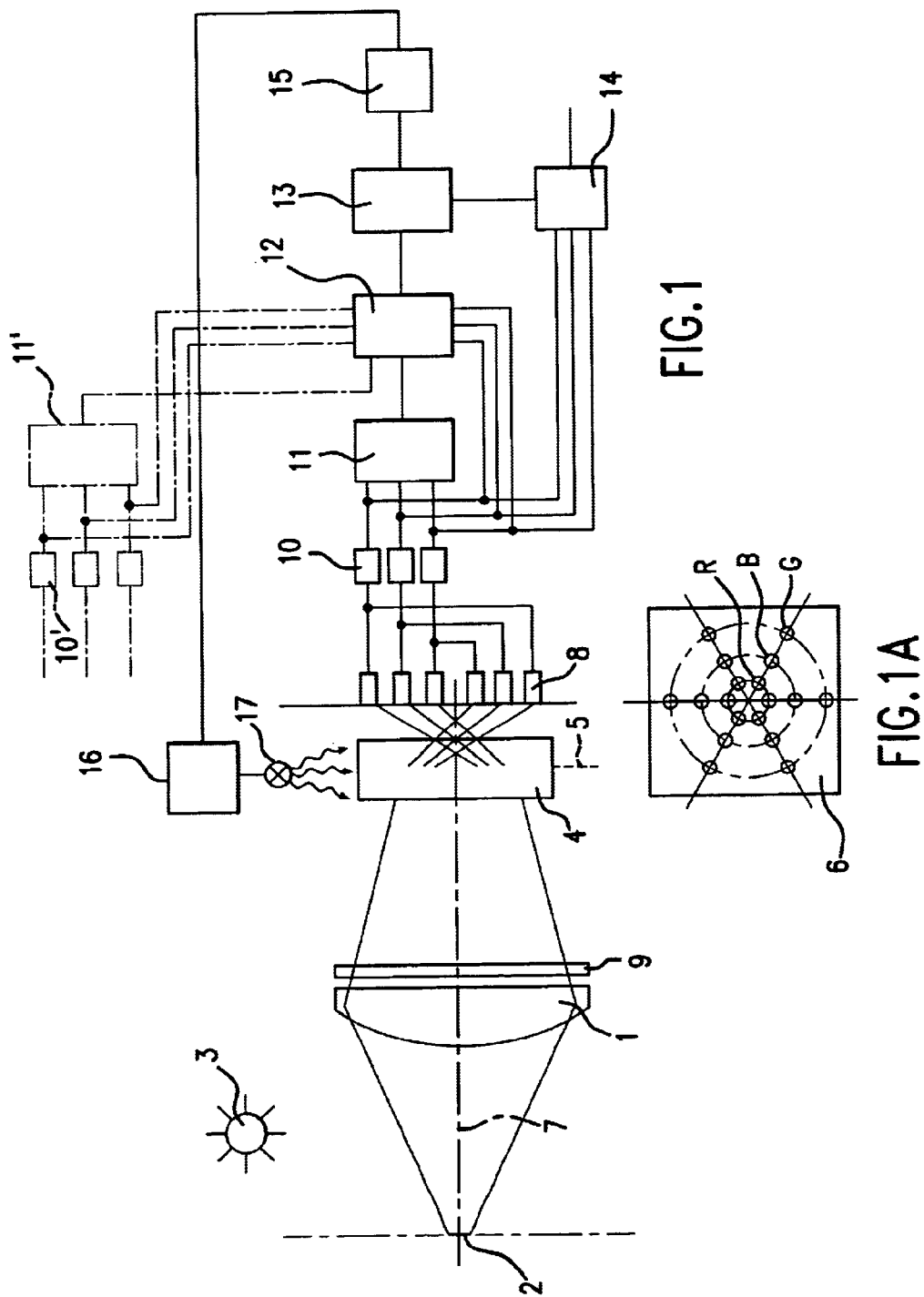

3D GRATING OPTICAL SENSOR COMPRISING A DIFFUSION PLATE FOR CONDUCTING CHROMATOMETRY WITH COLOR CONSTANCY PERFORMANCE

BACKGROUND OF THE INVENTION

A grating optical sensor is disclosed in WO 97/22 849. It is provided for accurately determining spatial and/or temporal spacings in focused image sequences of a lens/pupil system and/or determining spatial and/or temporal object parameters in real time such as, for example, speed or depth. A 3D grating has also already been used to carry out model calculations relating to the inverted retina of the human eye and to relate them to subjective phenomena known from human vision. In the preferred form, the 3D grating has a hexagonal structure. Other structures with centrosymmetrical diffraction patterns are, however, likewise possible.

Since the investigations of O. Lummer and the industrial development of daylight-like luminaires, it has been realized that there is an as yet unexplained resonance between sunlight and human vision. This has resulted in all the previous recommendations for approximating the spectrum of artificial light sources to the sunlight spectrum. In particular, in the case of color perception in phototopic day vision, there occur in the event of a change of illuminations having a different spectral composition of the radiation displacements of the color values which are compensated adaptively in human vision after a relatively short or, in part, relatively long time by means of approximate color constancy performances of the eye. The v. Kreis model, which attributes the adaptivity to the visual pigments of the retina, presently serves as an incomplete explanatory model for this. In addition, there are even more incomplete cortical explanatory models from other authors.

On the other hand, it has been documented many times that the phototopic seeing process cannot be characterized solely by the spectral light sensitivity of the individual cones. The very much more complex mode of operation of the visual sense requires knowledge of the luminance distribution in the entire visual field for the purpose of judging many visual tasks. Human vision is not based on the stimulus/reaction response of individual pixels. It takes account of the relative values over the entire field of view. In addition to chromatic adaptation effects, scattering of light at ocular media influences the extent of the achromatic axis (black-gray-white axis) centering the color space. It is therefore an illusion to believe that spectral photometers will be the ideal instruments of future chromatometry and color determinations, even if they are designed on the detection of overlapping RGB values. Likewise incomplete is a chromatometric technique which respectively dispenses with determining the triad of brightness/hue/saturation simultaneously and with reference to a entire field of view.

SUMMARY OF THE INVENTION

There is thus a growing need to have available in the future color sensors which can measure color values with reference to the spectral sensitivity curves of human vision, and ensure, given adaptation to artificial illuminations, an approximate color constancy corresponding to human vision. It is the object of the invention to create such a sensor.

The invention proceeds from the finding that it is possible, by inserting a diffractive multilayer (3D) grating into the image plane of an imaging lens/pupil system in the near field downstream of the grating (Fresnel/Talbot space; Fourier space or reciprocal grating), to make available three chromatic diffraction orders (RGB triple) with in each case six discrete interference maxima on mutually concentric circles, such as are described in the case of a hexagonal grating structure by means of the v. Laue equation known from crystal optics.

The v. Laue equation for diffractive space lattices requires for the production of constructive interference maxima the simultaneous satisfaction of the three phase conditions in the equation |1|

$$(\cos\alpha - \cos\alpha°) = h1\lambda/gx$$

$$(\cos\beta - \cos\beta°) = h2\lambda/gy$$

$$(\cos\gamma - \cos\gamma°) = h3\lambda/gz \quad |1|$$

(h1 h2 h3=triple of integral diffraction orders n; $\alpha°$, $\beta°$, $\gamma°$=aperture angle of the light cone incident in the 3D grating, relative to x, y, z; $\alpha$, $\beta$, $\gamma$=angle of the diffraction orders relative to x, y, z; $\lambda$=wavelength; and gx, gy, gz=grating constant in the x-, y-, z-axial direction). Assuming a hexagonal packing of the optically diffracting elements and grating constant dimensions in $\mu$m of gx=$2\lambda111$, gy=$4\lambda111/\sqrt{3}$, gz=$4\lambda111$, in equation |2|, $\lambda111$ constitutes the wavelength diffracted with maximum transmission into the 111 diffraction order.

$$\lambda h1h2h3 = \lambda111 = \frac{2\left(\frac{h1}{gx}\cos\alpha^* + \frac{h2}{gy}\cos\beta^* + \frac{h3}{gz}\cos\gamma^*\right)}{\frac{h1^2}{gx^2} + \frac{h2^2}{gy^2} + \frac{h3^2}{gz^2}} \quad |2|$$

In the case of perpendicular incidence of light ($\alpha° = \beta° = 90°$, $\lambda = 0°$) a triple of chromatic diffraction orders results in the visible spectral region (380–780 nm)

$\lambda 111$ (longest wavelength) RED $\lambda 123$ (average wavelength) GREEN $\lambda 122$ (shorter wavelength) BLUE The spectral transmission curves, which are centered relative to one of these $\lambda$max in each case, have a Gaussian shape and are determined at their half width by the number of the surface gratings in the z direction that are present in the 3D grating. In the event of incidence of white light, that is to say light of identical energy in all spectral components, and the grating inserted into the image plane of the imaging system, given the selection of $\lambda 111 = 559$ nm, the result is the trichromatism of the diffraction orders at $\lambda 111$ RED=559 nm $\lambda 123$ GREEN=537 nm $\lambda 122$ BLUE=447 nm There is thus a trichromatic tuning of the 3D grating, which is based on the resonant setting of the grating constants gx and gz to an integral $\lambda 111$, and in which a trichromatic equilibrium of the brightness values (Patterson amplitudes$^2$ weights) is produced in the RGB diffraction orders.

In the case of adaptive chromatic retuning of the 3D grating to an illumination other than a white one, the relation of the RGB $\lambda$max (1 : 0.96 : 0.8 or 25 : 24 : 20) is always maintained. $\lambda 111$ is the resonant wavelength determining the triple shifts to shorter $\lambda 111$ wavelengths in the event of change to a blue illumination, and to longer $\lambda 111$ wavelengths in the event of change to a red illumination. The adaptive shift ends with the complete adaptation to the new illumination, that is to say with the resonant finding of a new RGB equilibrium, of the trichromatically additive white standard, which recenters the color space. The actual resonance factor is the phase velocity nvλ=c (n=refractive index of the medium, v=frequency of the light, c=speed of the light).

The following new configuration of the sensor design forms the basis for the color constancy performance of the 3D grating optical sensor in the case of adaptation to variable illuminations.

A diffusion plate or disc or glass (hereinafter "diffusion glass") or one or more light diffusing gratings are incorporated into the pupil plane (aperture space) of the imaging optical system. Their function is to be seen in that they scatter diffusely as incoherent background into the image plane information likewise present at each location in the pupil, spatially the sum of the spectral intensities and local frequency values which are irradiated into the pupil by all objects in the object space and contribute to optical imaging. As a result, each local image location is supported by the global information on the entire field of view, against which each local pixel must stand out by being differentiated from it, specifically in brightness, hue, saturation etc. However, each item of local information thereby remains relativized in terms of the global background of the entire field of view.

All the lenses, diffusion glasses or gratings are designed such that they are transparent exclusively for electromagnetic radiation in the visible spectrum (380–780 nm) and therefore these delimit an octave of the wavelengths or frequencies with definite absorption edges. This boundary condition is important because thereby spectral brightness values which could come about through variation in the illumination are cut off at these absorption edges.

In the near field downstream of the diffractive 3D grating, the RGB interference maxima (3×6 concentric maxima) assigned to a local pixel are interconnected via photoreceivers set in a constant fashion in terms of their spectral sensitivity to white sunlight (of identical energy in all spectral components) in such a way that a local RGB sum can be formed as a trichromatically additive brightness value by means of an appropriate evaluation. It is possible thereby to differentiate RGB equilibriums and disequilibriums. RGB equilibriums correspond in the object space to visible colorless surfaces or illuminations (black-gray-white objects). If illuminations are not visible, but can be inferred only via colorless objects or surfaces, they are represented in terms of their spectral characteristic by gray or white surfaces, what are termed mirrors of the illuminations. The image location with RGB equilibrium, which achieves the greatest aggregate brightness, supplies what is termed the white standard, and thereby defines the tip of the achromatic axis centering the color space. Alternatively, the image location whose RGB values most closely approximate an equilibrium takes over this provision of a white standard. This explains that the white standard can be displaced in the trichromatic space.

The design of a diffractive 3D grating optical sensor which provides trichromatic RGB values in three diffraction orders ensures color constancy when there is ensured together with the sudden or gradual change in the illumination in the object space a resonant mechanism, that is to say one that is adaptive to the spectral composition of the illuminations in the 3D grating, which corresponds to a chromatic tuning of the 3D grating. In the case of a white illumination, that is to say an equal-energy spectral composition, corresponding to average sunlight, of the visible light, three grating constants in the xyz-axial direction are tuned to the RED wavelength (559 nm), with standing wave formation in the x- and z-axial directions, that is to say resonance in the 3D grating. Identical values, that is to say RGB equilibriums, result thereby under the three Gaussian spectral photopic curves of the photoreceptors (cones in human vision). The white standard is determined via the RGB sum values of the three Gaussian curves, which are centered relative to the wavelengths 559 nm RED/537 nm GREEN/447 nm BLUE.

After a sudden or gradual change in the illumination, a chromatically triggered reconstruction of the grating constants takes place in the diffractive 3D grating. In the case of a displacement of illumination to the longer wavelength region of the spectrum, the white standard in the 3D grating, still tuned to 559 nm RED, suddenly breaks down. If the adaptive mechanism of the shifting of the white standard then acts in the direction of the changed illumination, the grating achieves a new RGB equilibrium in the case of a chromatic tuning to 728 nm RED, for example. The trichromatically additive color space is thereby centered again relative to an achromatic axis, and the colors are correct again, being experienced as correct.

If, by contrast, the illumination is displaced toward the shorter wavelength spectrum, the grating achieves a new RGB equilibrium, for example in the case of a chromatic tuning to 513 nm RED.

The adaptive process, which leads as a result to a trichromatic restandardization of the color space in a changed white standard, can be described by the already explained v. Laue equation of crystal optics. The actual resonance factor is the phase velocity in the medium. Spectral triggering of the grating constant dimensions corresponds to the coefficient of thermal expansion for the RED wavelength in the RGB triple. It is possible by means of dosed IR, that is to say thermal irradiation in the 3D grating, or by varying the internal pressure in the 3D grating to vary the grating constant dimensions correspondingly. The sensor according to the invention can thereby ensure the color constancy properties of the human vision system.

A color constancy sensor which is represented technically in the form of a 3D grating or preprocessing filter that can resonate with the centroid of the spectral component of a light source or illumination is very important for all applications in which the color of fabrics and materials must be detected, differentiated and classified by the color perception forming the basis of the laws of human vision. This also holds for the relevant judgment of properties of visible objects that are associated with the hue characteristics, whether this be in general image processing, whether with automatic viewers in robotics or autonomously driving vehicles, indeed even in the case of sensors for the blind. At the same time, such a sensor is able to render color perceptions under artificial light sources predictable and measurable. Since such a 3D grating transforms the physical parameters (intensity and wavelength) into the psychological triad of brightness, hue and saturation, it is also possible to use a sensor to calculate brightness and saturation values of object surfaces.

BRIEF DESCRIPTION OF THE DRAWINGS

An exemplary embodiment of the grating optical sensor according to the invention is illustrated diagrammatically in the drawing and described with the aid of the figures, in which:

FIG. 1 shows the design of the sensor,

FIG. 1a shows the plan view of a centrosymmetrically trichromatic diffraction pattern.

DETAILED DESCRIPTION OF THE PREFERRED EMBODIMENTS

Figure 2A:
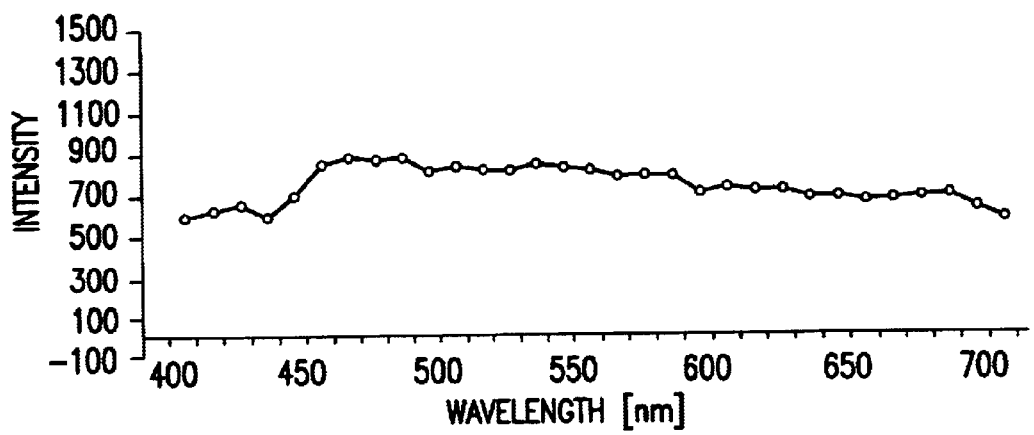
FIGS. 2A and 2B show the adaptation to a white illumination.

The grating optical sensor illustrated schematically in FIG. 1 includes as lens/pupil system an imaging lens 1. The latter projects the image of a visible object 2, which is illuminated by a radiation source 3 emitting white light, from the object space onto a hexagonal diffractive 3D grating optical modulator 4 with the grating constants gx, gy, gz in the image plane 5. Three chromatic RGB diffraction orders in the diffraction pattern 6 with six concentric maxima (Patterson weights) each result in a known way for each imaged object 2 in the visible spectrum due to diffraction in the modulator 4, resonance between $\lambda 111$ and the grating constants, and interference in the near field downstream of the modulator 4. These are illustrated once again in plan view in FIG. 1a for an object 2 situated on the optical axis 7 of the sensor. In this case, the red (R) diffraction order is situated on the inner ring, the blue (B) on the middle ring, and the green (G) on the outer ring.

Each diffraction order is assigned a photoelectric receiver 8. All the receivers 8 are set to the same spectral sensitivity for a radiation source 3 emitting white light.

Objects situated outside the optical axis 7 supply identical diffraction patterns 6, which can also be interleaved. The resolution of the image depends on the grating constants of the modulator 4. Each diffraction pattern is assigned a specific object.

A diffusion glass 9 is inserted into the pupil plane of the lens 1 or a plane conjugate thereto. This diffusion glass 9 can advantageously have a diffracting grating structure. Since imaging beams from all the objects in the object space run through each location of the pupil, image information from the entire object space is distributed simultaneously over the image plane via each diffusion center outward from the pupil plane. Consequently, information on the overall image is superimposed on each local image of an object. The diffusion characteristic of the diffusion glass 9 is to be selected such that diffusion takes place as uniformly as possible over the entire image field, and an image of the local object on the background produced by diffusion is maintained.

The spectral transmission of the lens 1, the diffusion glass 9, and the modulator 4 are limited to the visible region of electromagnetic radiation, in particular to the wavelength region of 380–780 nm.

All the receivers 8, assigned to the same diffraction order R, G, B, of a diffraction pattern 6 are interconnected for the purpose of forming a local chromatically additive brightness value 10. The local trichromatically additive brightness values 11 are additionally produced therefrom downstream.

The local chromatically additive and trichromatically additive brightness values 10, 11 of the diffraction pattern 6, and the corresponding brightness values 10', 11' of other diffraction patterns are fed to a comparison arrangement 12 for the purpose of determining the diffraction pattern with the best agreement between the chromatically additive brightness values 10, 10' and, simultaneously, a maximum trichromatically additive brightness value 11, 11'. The corresponding brightness values of the selected diffraction pattern are led to a white standard forming unit 13 for the purpose of producing a white standard signal or value. The agreement between the three chromatically additive brightness values means that a colorless object detail is involved. The magnitude of the trichromatically additive brightness value specifies an evaluation on the black-gray-white scale.

The chromatically additive brightness values 10, 10' of the individual diffraction patterns can also be fed to a color value forming unit 14. The sum of the three different chromatically additive brightness values that, are referred in each case to the white standard signal, for example multiplied by the reciprocal of the white standard, forms the output signal for the local color value. If there is no measured white standard value available, the color evaluation can also be carried out by forming the ratio with a fictional white standard value.

The process of white standard formation can be checked permanently or in periodic sequence in a variation signaling unit 15. A variation in the illumination leads either only to a change in the trichromatically additive brightness value 11, 11' of the diffraction patterns selected for the white standard, while an RGB equilibrium is maintained. The white standard value is displaced in this case only on the achromatic axis, centering the color space, for black-gray-white objects.

If the variation in the illumination also leads, however, to an RGB disequilibrium in the diffraction pattern determining the white standard, the cause resides in a variation in the spectral composition of the illumination. The variation signaling unit 15 establishes such a variation and controls an adapter 16 which is assigned a thermal radiation source 17. Thermal radiation on the modulator 4 causes variation in its grating constant as a function of the coefficient of thermal expansion until the white standard forming unit 13 displays a new white standard value. This adaptation process corresponds to an inclination of the achromatic axis centering the color space.

Figure 2B:
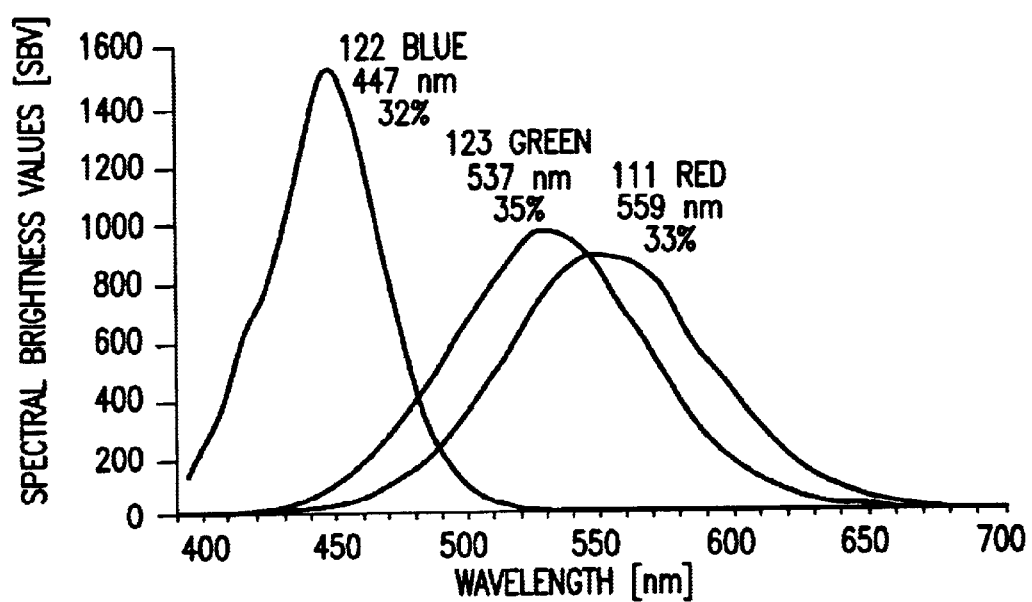

FIGS. 2A and 2B firstly illustrate the adaptation to a white illumination with spectral components of approximately the same energy. The intensity of emission is illustrated in the upper diagram as a function of wavelength. A diffractive hexagonal 3D grating in this case supplies three diffraction orders whose Gaussian spectral transmission curves are centered in relation to $\lambda 111=559$ nm (RED), $\lambda 123=537$ nm (GREEN) and $\lambda 122=447$ nm (BLUE). This corresponds to the sensitivity of the cones in human day vision. The Gaussian curves illustrated in the lower diagram can be described by $a^{-1} \exp(-x^2)$, with $x=(\lambda h1\ h2\ h3-\lambda)/n$ and $a=0.92$ at $n=55$ for 111 RED, $a=0.88$ at $n=53$ for 123 GREEN, and $a=0.56$ at $n=34$ for 122 BLUE. The achromatic, that is to say gray to white, objects reproduce the spectral properties of the illumination in the object space to the extent that this itself is invisible. The product of the spectral intensities and spectral Gaussian curves produce identical brightness aggregate values of 33% each in the three diffraction orders. Their RGB equilibrium supplies the white standard, which centers the trichromiatic color space. In the table below, the values of the spectral brightness distribution are summarized in accordance with the Gaussian curves assigned to the diffraction orders, for the case of a white illumination.

Figure 3A:
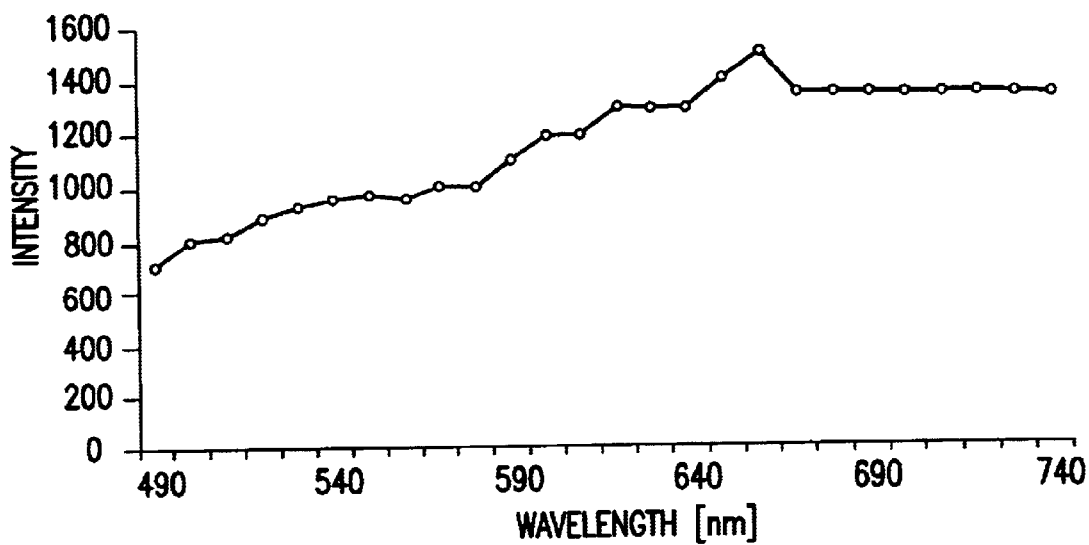
FIGS. 3A and 3B show the adaptation to a red illumination.
Figure 3B:
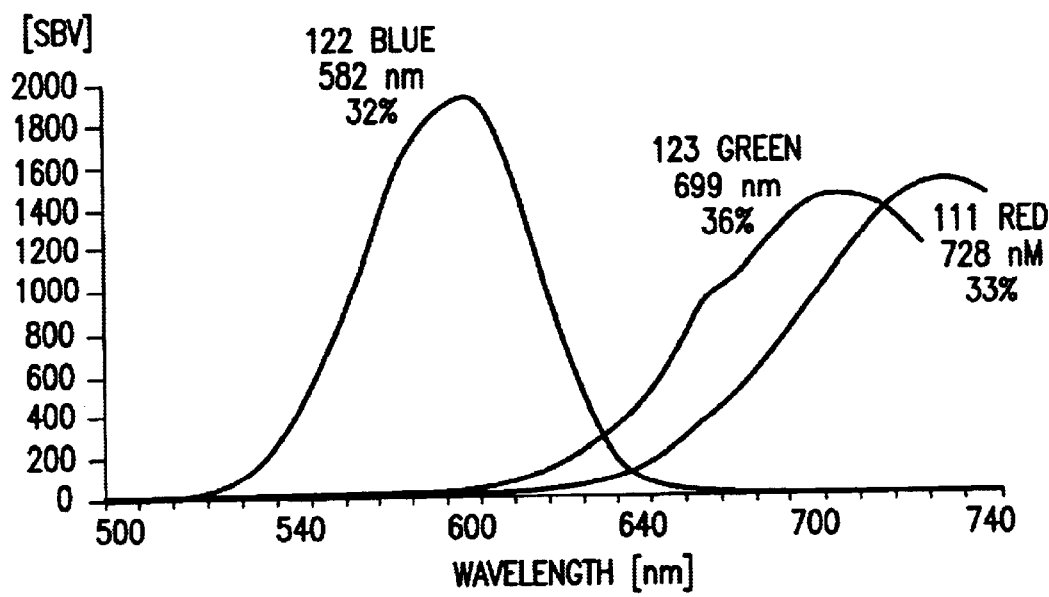
Figure 4:
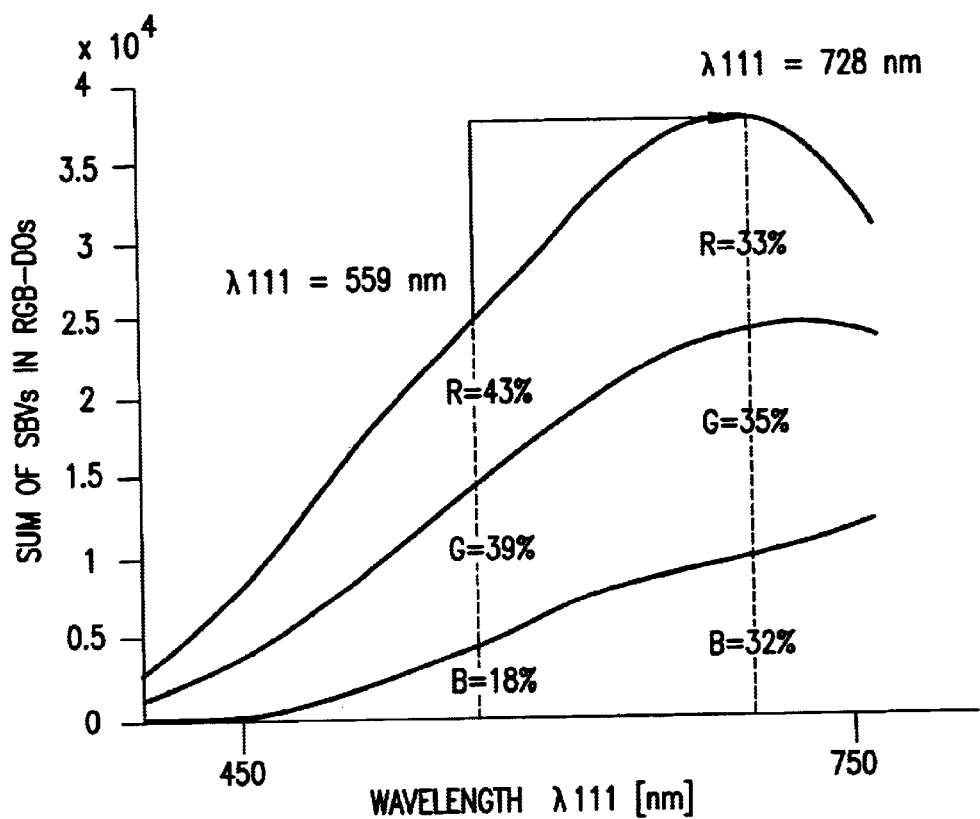
FIG. 4 shows the cycle of the operation of adapting to a red illumination.

FIGS. 3A and 3B and FIG. 4 illustrate the adaptation to an illumination displaced to the red. The intensity of emission is illustrated once again in the upper image as a function of wavelength, and that of the associated Gaussian spectral transmission curves is illustrated in the lower image of FIG. 3B. The 3D grating optical adaptation to a red illumination leads via a chromatic tuning of the three grating constants at λ111=728 nm RED, λ123=699 nm GREEN, λ122=582 nm BLUE to a new trichromatic RGB equilibrium position which is displaced to the longer wavelength end of the spectrum and forms the new white standard. The product of variable spectral energy distribution in the illuminating light and a constant triple of the Gaussian curves results in the new distributions of the spectral brightness values in the RGB diffraction orders, as they are summarized in the following table.

The resonant adaptation operation illustrated in FIG. 4 starts with a disequilibrium in the RGB diffraction orders at 43% R, 39% G, 18% B, which was initiated by the sudden change from the white to the red illumination. Gradually progressive 3D grating optical resonance with longer λ111 wavelengths finally leads to the chromatic grating constant tuning at λ111=728 nm RED, and thus to the new RGB equilibrium with 33% R, 35% G and 32% B.

Figure 5A:
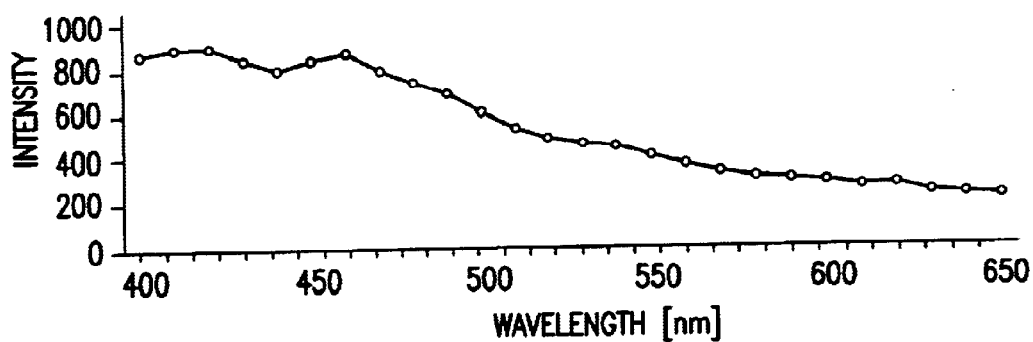
FIGS. 5A and 5B show the adaptation to a blue illumination.
Figure 5B:
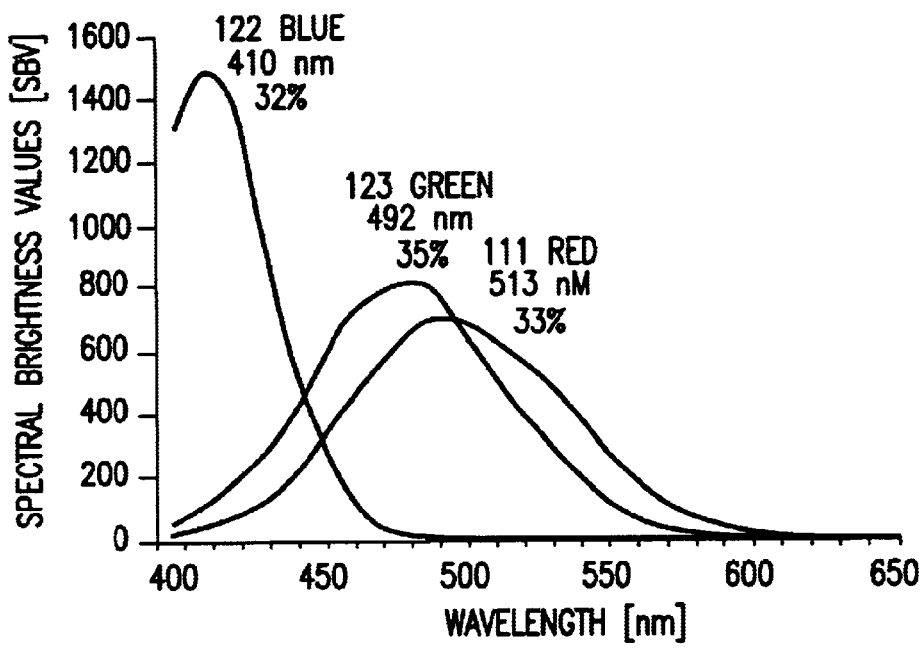
Figure 6:
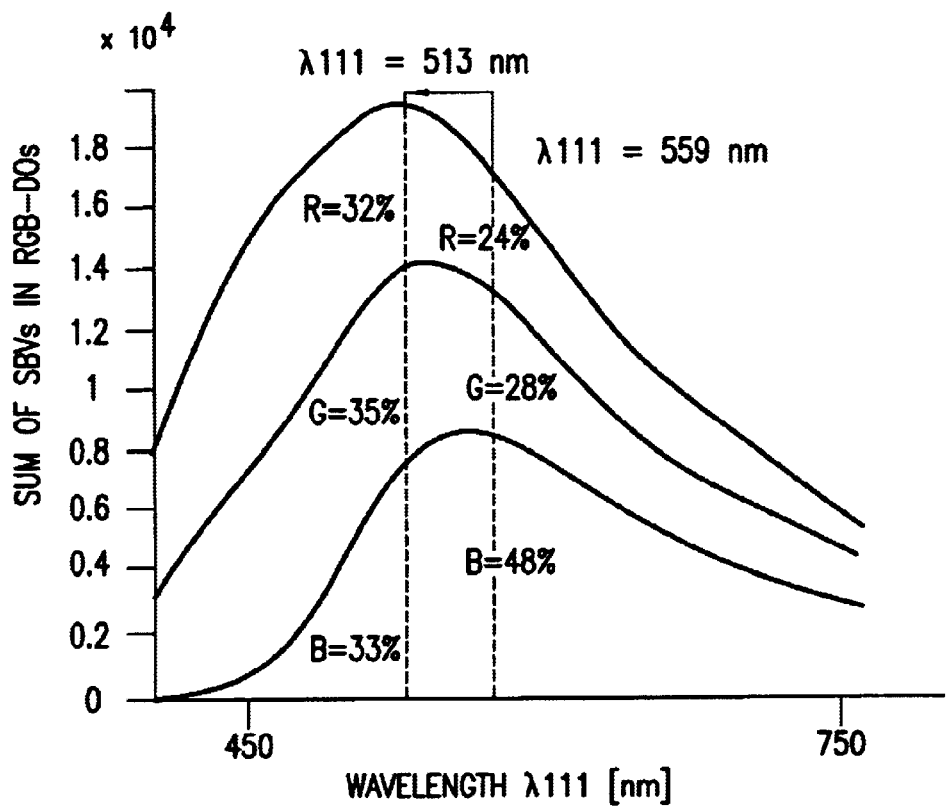
FIG. 6 shows the cycle of the operation of adapting to a blue illumination.

FIGS. 5A and 5B and FIG. 6 show in a similar way the 3D grating optical adaptation to a blue illumination via a chromatic tuning of the three grating constants at λ111=513 nm RED, λ123=492 nm GREEN, λ122=410 nm BLUE to a new trichromatic RGB equilibrium position, that is displaced to the short-wave end of the spectrum and forms the new white standard. The product of variable spectral energy distribution in the illuminating light and a constant triple of the Gaussian curves results in the new distributions of the spectral brightness values in the RGB diffraction orders, as they are summarized in the following table.

| Visible spectrum wavelength (nm) | Spectral intensity of illumination Blue (T 1) | 3. Spectral brightness values | | | |
|---|---|---|---|---|---|
| | | 122 BLUE 410 nm | 123 GREEN 492 nm | 111 RED 513 nm | Sum RGB |
| 400 | 870 | 1304 | 47 | 15 | 1366 |
| 410 | 900 | 1481 | 91 | 32 | 1604 |
| 420 | 910 | 1384 | 159 | 62 | 1605 |
| 430 | 850 | 1004 | 241 | 103 | 1348 |
| 440 | 810 | 625 | 346 | 164 | 1135 |
| 450 | 850 | 360 | 509 | 271 | 1140 |
| 460 | 880 | 172 | 688 | 411 | 1271 |
| 470 | 800 | 61 | 760 | 513 | 1334 |
| 480 | 750 | 18 | 807 | 619 | 1444 |
| 490 | 700 | 5 | 795 | 695 | 1495 |
| 500 | 620 | 1 | 692 | 693 | 1386 |
| 510 | 550 | | 561 | 648 | 1209 |
| 520 | 500 | | 435 | 582 | 1017 |
| 530 | 480 | | 331 | 516 | 847 |
| 540 | 460 | | 234 | 428 | 862 |
| 550 | 420 | | 147 | 315 | 462 |
| 560 | 380 | | 85 | 216 | 301 |
| 570 | 340 | | 45 | 137 | 182 |
| 580 | 320 | | 24 | 86 | 110 |
| 590 | 310 | | 12 | 51 | 63 |
| 600 | 300 | | 5 | 29 | 34 |
| 610 | 280 | | 2 | 15 | 17 |
| 620 | 280 | | 1 | 8 | 9 |
| 630 | 250 | | | 3 | 3 |
| 640 | 240 | | | 1 | 1 |
| 650 | 230 | | | 1 | 1 |
| Sum | 14280 | 6415 | 7017 | 6614 | 20046 |
| % | 100 | 32 | 35 | 33 | 100 |

The resonant adaptation operation illustrated in FIG. 6 starts with s disequilibrium in the RGB diffraction orders at 24% R, 28% G, 48% B, which was initiated by the sudden change from the white to the blue illumination. Gradually progressive 3D grating optical resonance with shorter ?111 wavelengths finally leads to the chromatic grating constant tuning at λ111=513 nm RED, and thus to the new RGB equilibrium at 32% R, 35% G and 33% B.

The resonant adaptation operation also leads, of course, to a geometrical displacement of the position of the diffraction orders in the diffraction pattern, and thus with reference to the photoelectric receivers. However, this displacement always remains within the compass of the extent of the receiver surfaces.

I claim:

1. A grating optical sensor comprising: a lens imaging an object space; a diffractive hexagonal 3D grating optical modulator in the image plane of the lens to form at least one trichromatic RGB diffraction pattern; a photoelectric receiver arrangement arranged in the near field downstream of the modulator, having individual receivers configured to generate electric signals in accordance with centrosymmetrically trichromatic RGB diffraction orders of the diffraction pattern; an evaluation device for the electric signals generated by the individual receivers; and at least one light-diffusion plate arranged in either a pupillary plane of the lens or a pupillary plane conjugate to the lens or both.

2. The grating optical sensor as claimed in claim 1, wherein the light-diffusion plate has a grating structure.

3. The grating optical sensor as claimed in claim 1, wherein the plate has a diffusion characteristic selected so as to produce an image of the object space with uniformly superimposed background radiation from the object space.

4. The grating optical sensor as claimed in claim 1, wherein a spectral transmission of the lens, the diffusion plate, and the modulator is limited to the visible region of electromagnetic radiation.

5. The grating optical sensor as claimed in claim 4, wherein the spectral transmission is limited to the wavelength region of 380–780 nm.

6. The grating optical sensor as claimed in claim 1, wherein the individual receivers are set to an identical spectral sensitivity for a radiation source emitting white light.

7. The grating optical sensor as claimed in claim 1, wherein the individual receivers assigned to the same chromatic diffraction order in the trichromatic RGB diffraction pattern are interconnected to form a local chromatically additive brightness value for each chromatic diffraction order.

8. The grating optical sensor as claimed in claim 7, wherein the evaluation device includes a comparison arrangement for determining which trichromatic diffraction pattern has the best agreement between the local chromatically additive brightness values.

9. The grating optical sensor as claimed in claim 1, wherein the individual receivers assigned to the trichromatic diffraction pattern are interconnected to form a local trichromatically additive brightness value.

10. The grating optical sensor as claimed in claim 8, wherein the evaluation device includes a white standard forming unit whose output signal is a white standard signal and is respectively assigned to that local diffraction pattern having the best agreement between the chromatically additive brightness values and a simultaneously maximum trichromatically additive brightness value.

11. The grating optical sensor as claimed in claim 10, further comprising an adapter provided for varying a 3D grating constant of the modulator as a function of a variation in an agreement between the local chromatically additive brightness values of the diffraction pattern forming the white standard signal.

12. The grating optical sensor as claimed in claim 11, wherein the adapter includes a thermal radiation source directed toward the modulator.

13. The grating optical sensor as claimed in claim 12, wherein the adapter is assigned a controller which keeps a radiation intensity of the thermal radiation source constant during assignment of a new white standard signal.

14. The grating optical sensor as claimed in claim 10, wherein the evaluation device includes a color value forming unit whose output signal respectively corresponds to the sum of the local chromatically additive brightness values, referred to the white standard signal, of said local diffraction pattern having the best agreement.

15. A method for generating a white standard signal, comprising:

providing a grating optical sensor, the sensor comprising: a lens imaging an object space; a diffractive hexagonal 3D grating optical modulator in the image plane of the lens to form at least one trichromatic RGB diffraction pattern; a photoelectric receiver arrangement arranged in the near field downstream of the modulator, having individual receivers configured to generate electric signals in accordance with centrosymmetrically trichromatic RGB diffraction orders of the diffraction pattern; and an evaluation device for the electric signals generated by the individual receivers;

superimposing into the image plane an incoherent background radiation assigned to the object space by diffuse scattering in either a pupil of the imaging lens or a plane conjugate to the lens or both; and forming a white standard signal from the diffraction pattern, assigned to a colorless part of the object space, with identical chromatically additive brightness values and a maximum trichromatically additive brightness value.

16. The method as claimed in claim 15, wherein, when varying an illumination of the object space, grating constants of the modulator are varied by thermal influence until a new white standard signal is produced in the trichromatic diffraction pattern of a colorless part of the object space.

17. The method as claimed in claim 15, wherein the sum of the chromatically additive brightness values referred to a white standard signal is formed in order to generate a color value signal from the diffraction pattern assigned to a colored part of the object space.

* * * * *